(12) United States Patent
Bucher et al.

(10) Patent No.: US 7,699,356 B2
(45) Date of Patent: Apr. 20, 2010

(54) QUICK CONNECTOR FOR FLUID CONDUIT

(75) Inventors: Michael R. Bucher, Clinton Township, MI (US); Thomas Geiser, Casco, MI (US); Russell Hutchins, Saint Clair, MI (US)

(73) Assignee: Craig Assgembly, Inc., St. Clair, MI (US)

( * ) Notice: Subject to any disclaimer, the term of this patent is extended or adjusted under 35 U.S.C. 154(b) by 0 days.

(21) Appl. No.: 12/108,570

(22) Filed: Apr. 24, 2008

(65) Prior Publication Data

US 2008/0277929 A1 Nov. 13, 2008

Related U.S. Application Data

(60) Provisional application No. 60/928,643, filed on May 10, 2007.

(51) Int. Cl.
*F16L 39/00* (2006.01)
(52) U.S. Cl. .................. 285/321; 285/244; 285/305; 285/351
(58) Field of Classification Search .............. 285/244, 285/305, 307–308, 321, 330, 351, 921
See application file for complete search history.

(56) References Cited

U.S. PATENT DOCUMENTS

| 3,314,696 | A | * | 4/1967 | Ferguson et al. ........ 285/148.14 |
| 4,813,716 | A | * | 3/1989 | Lalikos et al. .......... 285/148.14 |
| 4,884,829 | A | * | 12/1989 | Funk et al. ................... 285/24 |
| 5,052,725 | A | * | 10/1991 | Meyer et al. ................ 285/308 |
| 5,695,223 | A | * | 12/1997 | Boticki ........................ 285/23 |
| 5,964,483 | A | * | 10/1999 | Long et al. .................. 285/305 |
| 6,082,779 | A | * | 7/2000 | Lesser et al. .................. 285/93 |
| 6,231,089 | B1 | * | 5/2001 | DeCler et al. ............... 285/308 |
| 6,848,723 | B2 | | 2/2005 | Lamich |
| 2001/0002754 | A1 | * | 6/2001 | Dobler et al. ............... 285/321 |
| 2004/0178629 | A1 | * | 9/2004 | Yoshida ..................... 285/305 |
| 2004/0183301 | A1 | * | 9/2004 | Yoshida ..................... 285/305 |

FOREIGN PATENT DOCUMENTS

DE          10017679 (C1)          9/2001

* cited by examiner

*Primary Examiner*—Aaron M Dunwoody
*Assistant Examiner*—Fannie Kee
(74) *Attorney, Agent, or Firm*—Harness, Dickey & Pierce, PLC

(57) ABSTRACT

A quick connector coupling has either a linear or an angled female coupling member, a male coupling member which is attached to a radiator, a bushing, a sealing means, and a locking ring, which maintains the connection of the male coupling member and the female coupling member. The male member has at least one chamfered surface, which is complementary to a chamfered surface on the bushing element. The locking ring is disposed around the female coupling member and has a plurality of indentations which pass through apertures positioned around the collar end of the female member. These indentations interconnect with an annular groove around the male member when coupled to the female member, securing the connection.

9 Claims, 5 Drawing Sheets

QUICK CONNECTOR FOR FLUID CONDUIT

CROSS-REFERENCE TO RELATED APPLICATIONS

This application claims the benefit of U.S. Provisional Application No. 60/928,643, filed on May 10, 2007. The disclosure of the above application is incorporated herein by reference.

FIELD

The present disclosure relates to quick connect couplings and, more particularly, to a quick connect coupling for coupling a conduit to a radiator or heat exchanger.

BACKGROUND

The statements in this section merely provide background information related to the present disclosure and may not constitute prior art.

Radiators, also known as heat exchangers, generally comprise a metallic header tank and connection pieces that are brazed onto them for connection of radiator hoses used to cool the engine. Generally, these hoses are attached by means of a barbed flange brazed onto the radiator upon which the radiator hose is slipped onto and secured by means of a hose clamp. Some hose clamps not only require placement at the proper location on the end of the hose as the hose is slipped over the barbed flange but, in addition, require manual tightening. Others utilize spring clips, but still require considerable manipulation in terms of properly locating the spring clip and then releasing pressure on the clip to allow the same to close tightly upon the hose and the nipple within the hose at that location.

Both of these types of connections, while effective in preventing leakage at the interface of the hose and the radiator, require considerably manual work to remove and replace and thus are not particularly economical, especially in a manufacturing assembly operation.

Furthermore, routine maintenance and repairs over the life of the vehicle often call for the hoses to be removed and replaced several times, causing wear on the end of the hose from repeated handling.

As a consequence, more recently, there have been proposals for so-called "quick-connect" couplings where it is merely necessary to fit one coupling half, associated with the heat exchange fluid conduit, to the other coupling half, associated with the heat exchanger header. One such proposal is found in German Patent Publication DE 100 17 679 C1, while another is found in U.S. Pat. No. 6,848,723.

Despite the advantages in the cited prior art, there is the need for a quick connector for a fluid conduit to attach to a radiator, which is simple and economical to manufacture and provides a superior seal between the conduit and the radiator, while still allowing for the quick separation when necessary.

SUMMARY

The quick connector of the present invention, having a primary use for connecting a fluid conduit to a radiator or heat exchanger, comprising either a linear or angled female coupling member, a male coupling member which is attached to the radiator, a bushing, a sealing means, and a locking ring which maintains the connection of the male coupling member and the female coupling member. The male member comprises at least one chamfered surface, which is complementary to a chamfered surface on the bushing element and provides the durability and increased sealing capabilities of this invention.

The locking ring is disposed around the female coupling member and comprises a plurality of indentations which pass through apertures positioned around the collar end of the female member. These indentations interconnect with an annular groove around the male member when coupled to the female member, securing the connection.

It is therefore an object of the present invention to provide an improved quick connector for a radiator or heat exchanger which can be used for a plastic hose coupling.

It is another object of the present invention to provide retaining means for the hose coupling which provides a secure, releasable locking means.

Another object of the invention is to provide an improved connection structure for a radiator/heat exchanger which provides a leakproof seal upon insertion of the male coupling element into the female coupling element.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
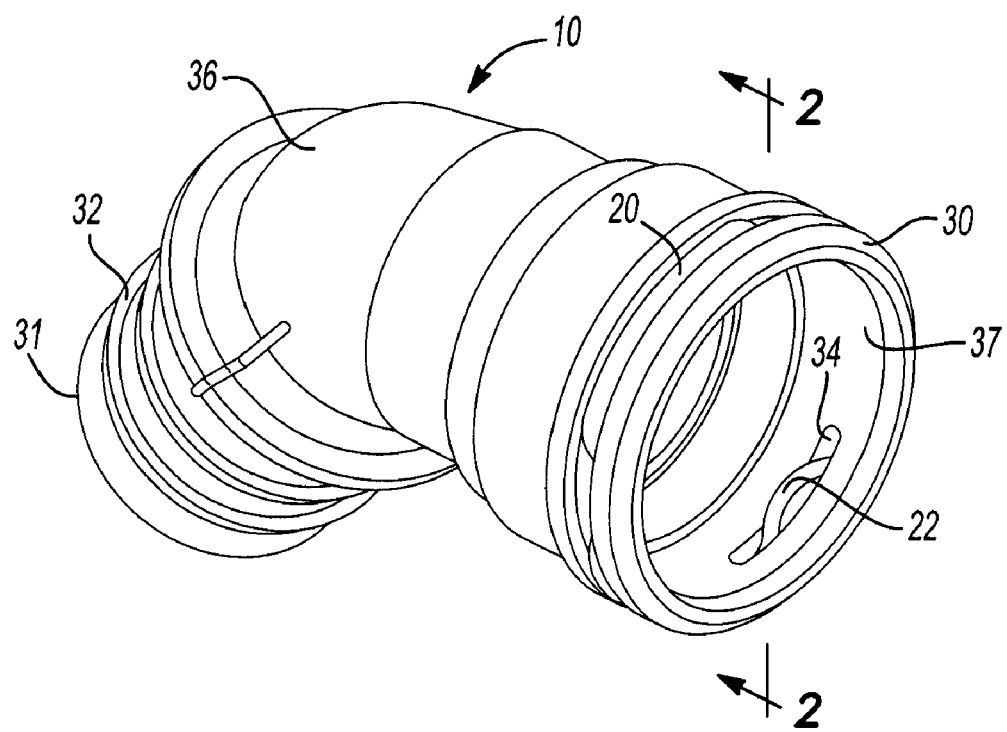
FIG. 1 illustrates a perspective view of a first embodiment having a female coupling element with an angled conduit attachment end.

The following description is merely exemplary in nature and is not intended to limit the present disclosure, application, or uses. It should be understood that throughout the drawings, corresponding reference numerals indicate like or corresponding parts and features.

Figure 2:
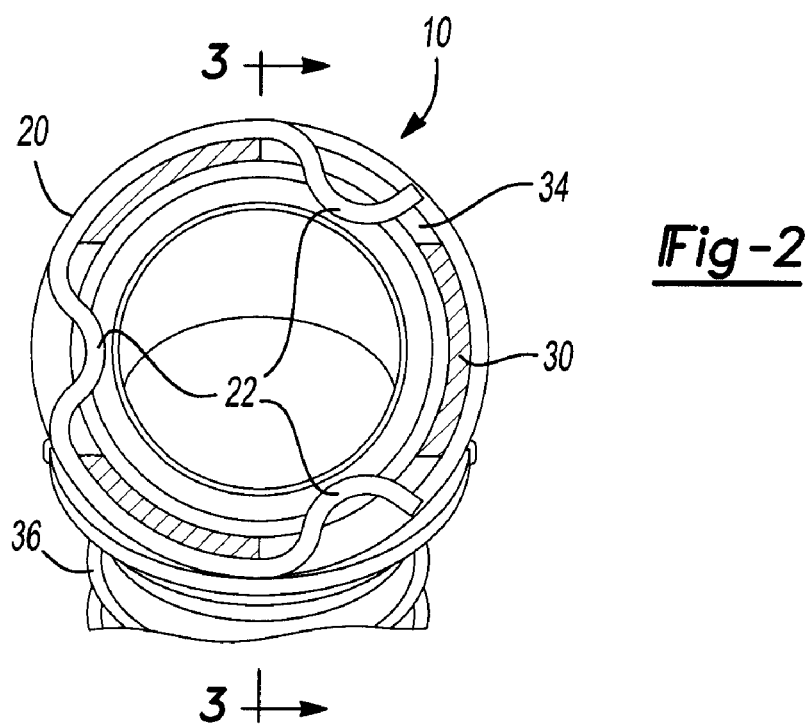
FIG. 2 is a cross-sectional end view of FIG. 1 taken across line 2-2.
Figure 3:
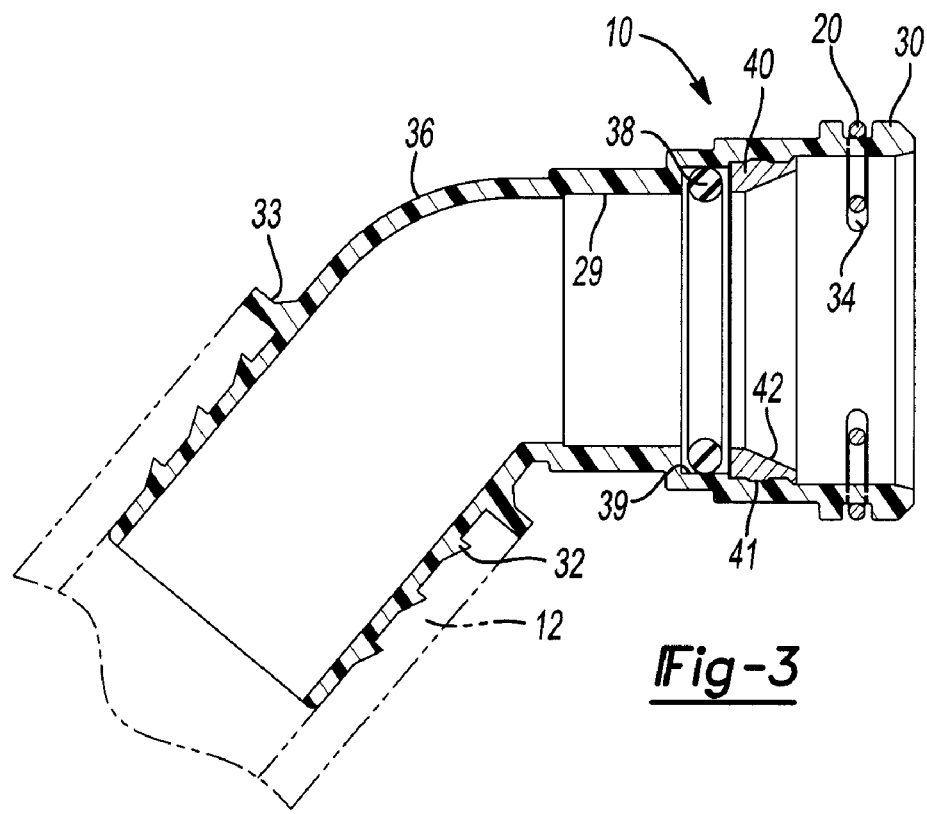
FIG. 3 is a cross-sectional side view of the female coupling element illustrated in FIG. 1.
Figure 4:
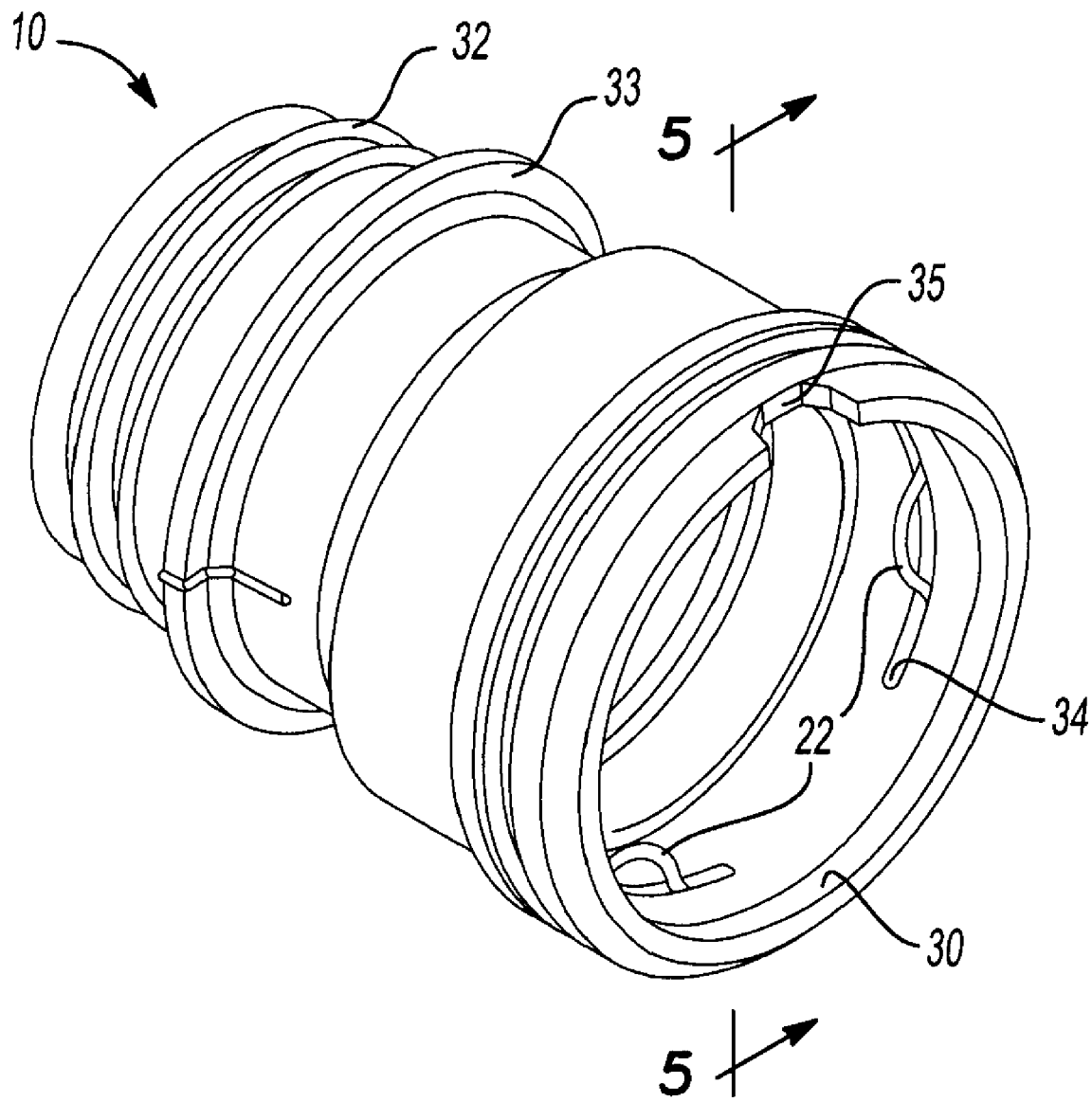
FIG. 4 is a perspective view of a second embodiment having a female coupling element with linear conduit attachment end.
Figure 5:
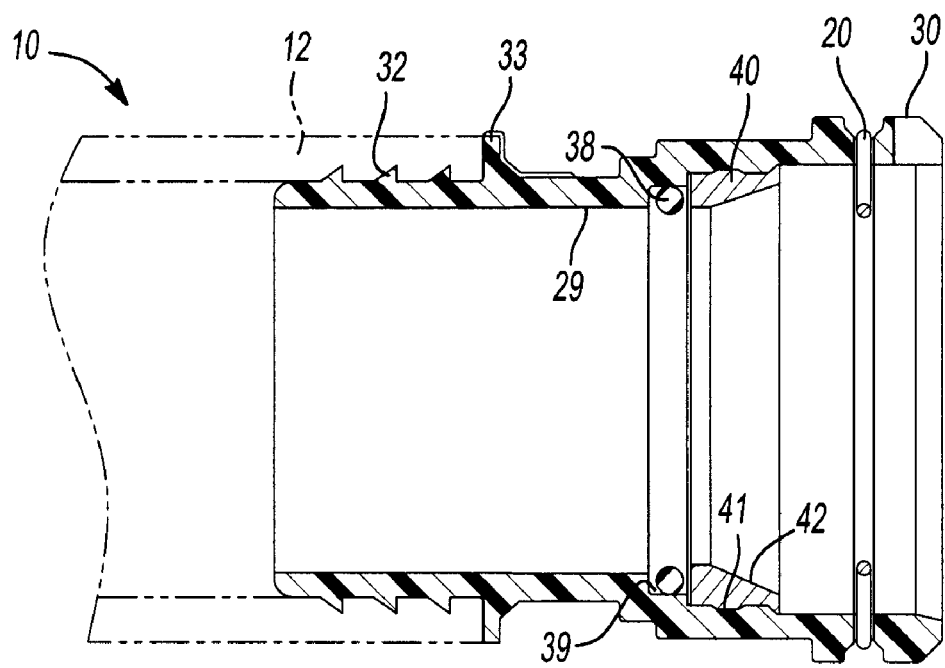
FIG. 5 is a cross-sectional side view of the female coupling element illustrated in FIG. 4, attached to a conduit.

Referring now to the figures, in particular FIGS. 1-5A, the female coupling member 10 of the quick connector of the present invention is shown, comprising a generally cylindrical body of either linear shape, shown in FIGS. 4 and 5, or having an angled portion 36, illustrated in FIGS. 1-3, depending upon the desired application of the female coupling member 10. The body of the female coupling member 10 further comprises a male coupling member receiving end 30 and a conduit attachment end 31 opposite the male coupling member receiving end 30.

The conduit attachment end 31 comprises a conduit stop flange 33 located around the body of the female member a distance from the edge of the conduit attachment end, preventing over insertion of the conduit 12. A plurality of barbed flanges 32, with the preferred embodiment comprising three barbed flanges, spaced between the conduit attachment end 31 and the stop flange, frictionally hold the conduit 12 to the female coupling member.

The male coupling member receiving end 30 comprises a first inner bore 37 for receiving the male coupling members 50 and 60 illustrated in FIGS. 6-9. Three slots 34 are positioned through the body of the female coupling member through the first inner bore 37 for receiving the indentations 22 of the locking ring 20. The locking ring 20 is positioned in an annular groove located around the outside of the male coupling member receiving end 30. This prevents lateral slippage of the locking ring 20 along the female member. The locking ring 20 is generally C-shaped, having three evenly spaced indentations 22, one proximal each of the distal ends of the locking ring 20 and one centered between the other two. When the locking ring 20 is in the annular groove of the male coupling member receiving end 30 of the female coupling member 10, the indentations 22 pass through each of the slots 34 to engage in the annular groove 58 located on the outside surface of male coupling member 50 and the annular groove 68 located on the outside surface of male coupling member 60.

A bushing 40 is positioned at the innermost point, within the first inner bore 37, and comprises an inner chamfered surface 42 for engaging complementary chamfered surfaces 52 and 62 of male coupling members 50 and 60, respectively. The outside diameter of bushing 40 comprises a small annular ridge 41 which engages with a complementary groove within the surface of inner bore 37 to retain the bushing 40 within the female coupling member when the male coupling member 50 or 60 is removed.

Between the first inner bore 37 and the transitional bore 29 is an intermediate bore 39, wherein sealing means 38 is positioned. The sealing means 38 comprises an O-ring which is positioned between the inner surface of intermediate bore 39 and the outer surface 56 or 66 of male coupling members 50 and 60, respectively. The sealing means 38 is compressible, providing a seal between the male coupling members 50 or 60 and the female coupling member 10.

Figure 3A:
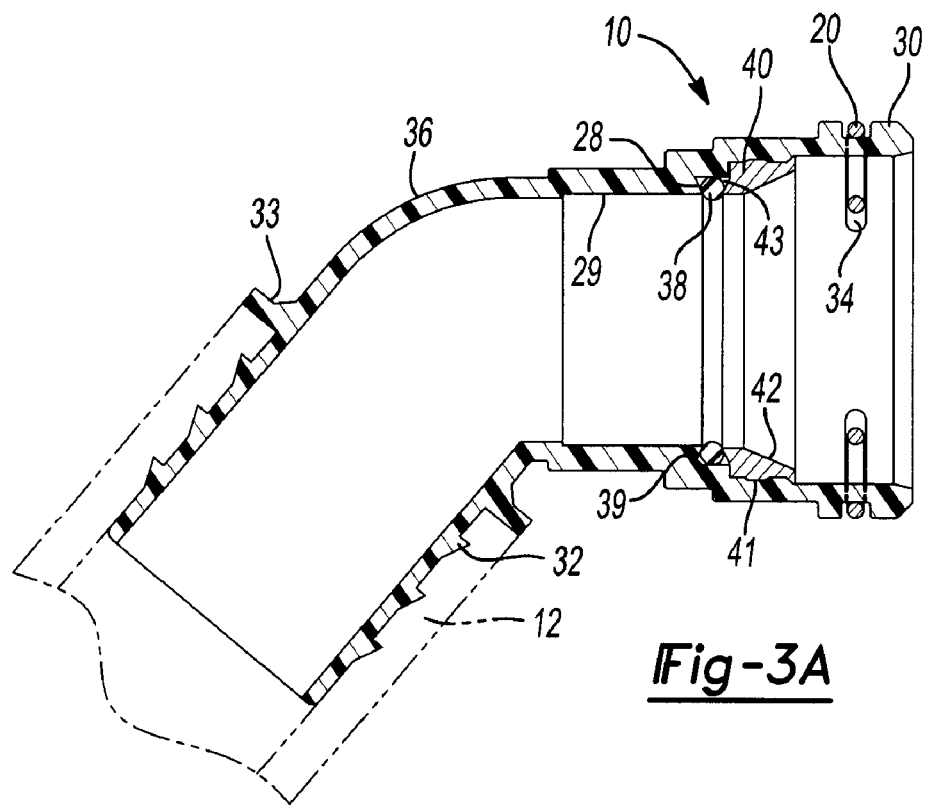
FIG. 3A is a cross-sectional side view of a further embodiment of the female coupling element illustrated in FIG. 1.
Figure 5A:
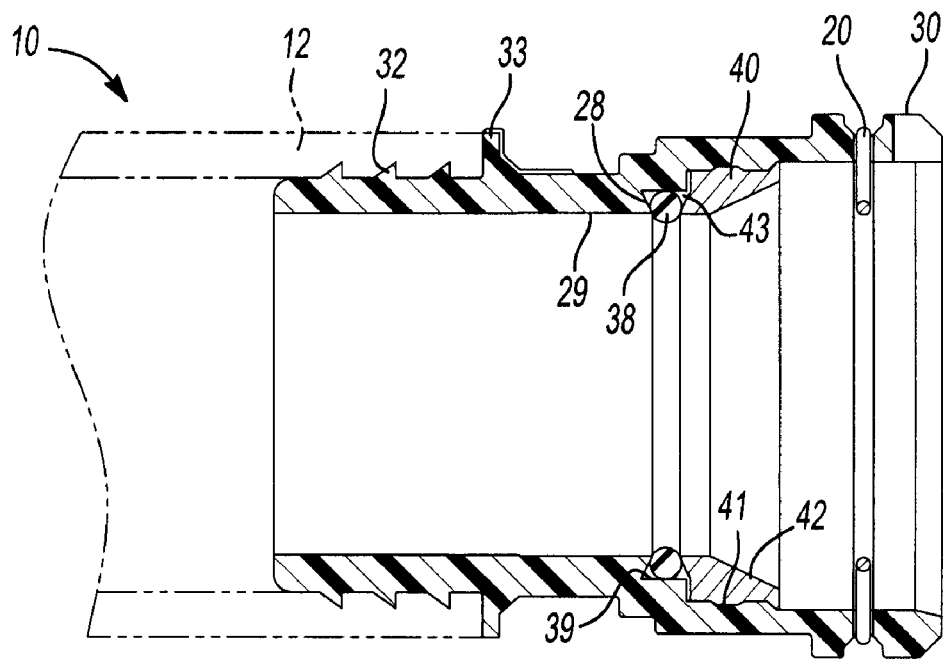
FIG. 5A is a cross-sectional side view of a further embodiment of the female coupling element illustrated in FIG. 4.
Figure 6:
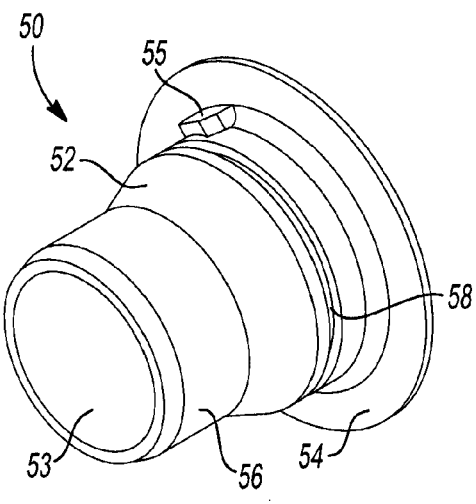
FIG. 6 is a perspective view of a first embodiment of a male coupling element having a thin flange for attachment to a radiator/heat exchanger.
Figure 7:
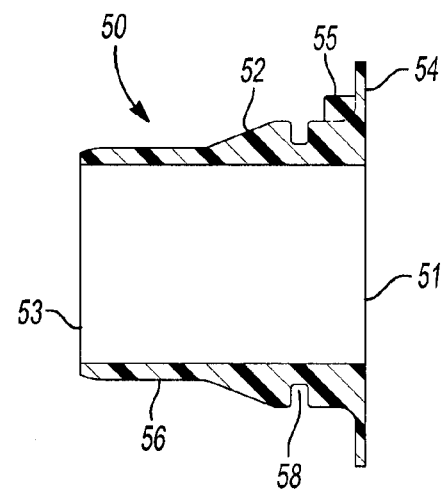
FIG. 7 is a cross-sectional side view of the male coupling element of FIG. 6.
Figure 8:
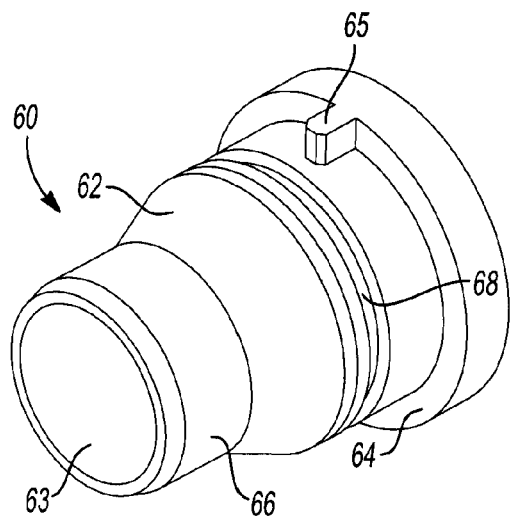
FIG. 8 is a perspective view of a second embodiment of a male coupling element having a wide flange for attachment to a radiator/heat exchanger.
Figure 9:
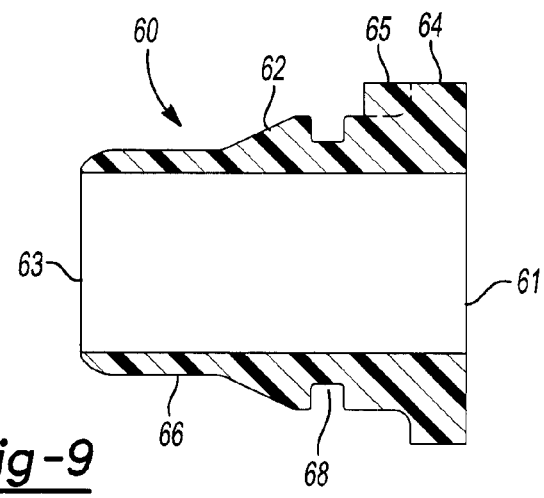
FIG. 9 is a cross-sectional side view of the male coupling element of FIG. 8.

In an alternative embodiment, illustrated in FIGS. 3A and 5A, a variation on how the sealing means 38 is retained is shown. In these embodiments, the transitional bore 29 comprises an inversed-angle transitional wall 28 to the inner bore 37. Furthermore, the bushing 40 also comprises an inversed-angled face 43 adjacent to the sealing means 38. Theses two angled surfaces form a dovetail groove within which the sealing means 38 is positioned, creating a more secured retention of the sealing means 38 within the female coupling member 10.

Referring back to FIGS. 6-9, the male coupling members 50 and 60 can comprise either a thin flange 54, as shown in FIGS. 6 and 7, or a wide flange 64, shown in FIGS. 8 and 9, depending on the desired application. The flange end comprises a through bore having a first end 51, 61, communicating with the heat exchanger/radiator, and a second end 53, 63, communicating with the inner bore of the female coupling member 10.

In a further embodiment, a tab 55, 65 is positioned on the outside of male coupling members 50, 60, respectively, adjacent to the flange. The tab 55, 65 is received within a complementary notch 35 located in the male coupling member receiving end 30 of the female coupling member, preventing rotational movement between the male coupling member 50, 60 and the female coupling member 10 when coupled together.

To couple the connector, the male coupling member is inserted into the female coupling member wherein the indentations 22, located on the locking ring 20, come into contact with chamfered surface 52 or 62, located on the male coupling members 50 or 60. As the male coupling member is inserted, these indentations ride up the chamfered surface, expanding the locking ring 20 outward until the male coupling member is fully inserted within the female coupling member. At this point, the indentations 22 are aligned with the annular groove 58 or 68 on the male member, wherein the indentations spring inward within the groove, securely retaining the male member within the female member.

To release the quick connector, the ends of the locking ring are simply pulled apart, which releases the indentations 22 from the annular groove of the male coupling member, allowing the female coupling member to slide out.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A quick connector coupling having a primary use for connecting a fluid conduit to a radiator or heat exchanger housing, comprising:

a male coupling member having a first end and a second end, wherein said first end attaches to a radiator housing and said male coupling member having at least one chamfered surface on the exterior of said male coupling member positioned between said first end and said second end, and said male coupling member further comprising an annular groove located around the outside of said male coupling member between said first end and said chamfered surface;

a female coupling member, said female coupling member having a first inner bore at a first end, a second intermediate bore having an internal diameter smaller than said first inner bore, and a transitional bore, said transitional bore having an internal diameter less than said second intermediate bore, and a greater diameter than a bore of a second end of said female coupling member, said second end being opposite said first end and comprising a plurality of radial barbed flanges on the exterior of said second end;

a bushing, said bushing having at least one interiorly chamfered surface, complementary to the at least one chamfered surface of said male member, wherein said bushing is positioned within said first inner bore, adjacent to said intermediate bore and wherein said bushing comprises an annular ridge which is received within a groove within said first inner bore of said female coupling member;

a sealing means, said sealing means being circumferentially complementary to and positioned within said second intermediate bore, adjacent to said transitional bore and retained in position by said bushing; and a locking ring, said locking ring being generally C-shaped, having two distal ends and three evenly spaced indentations, one proximal each of said two distal ends and one centered between the two indentations proximal the distal ends, wherein said three evenly spaced indentations protrude toward a center of said first inner bore at said first end of said female coupling member and wherein said locking ring maintains the connection of the male coupling member and the female coupling member, by means of said female coupling member further comprising three slots positioned through the body of said female coupling member through said first inner bore for receiving the three indentations respectively of said locking ring when said locking ring is positioned around the outside of said female coupling member proximal said first end, said indentations engaging with said annular grove in a releasable, spring-lock connection means in said groove located around the outside of said male coupling member.

2. The quick connector coupling of claim 1, wherein said transitional bore of said female coupling member further comprises an inversed-angle transition to said inner bore and said bushing also comprises an inversed-angled transition adjacent to said sealing means, wherein in combination these two inversed-angle transitions form a dovetail groove within which the sealing means is retained.

3. The quick connector coupling of claim 1, wherein said sealing means comprises an O-ring.

4. The quick connector coupling of claim 1, wherein said plurality of radial barbed flanges on the exterior of said second end of said female coupling member comprises three flanges.

5. The quick connector coupling of claim 1, wherein said male coupling member further comprises a tab positioned on the outside of said male coupling member adjacent said first end, said tab being received within a complementary notch located in the first end of said female coupling member, preventing rotational movement between said male coupling member and said female coupling member.

6. A quick connector coupling having a primary use for connecting a fluid conduit to a radiator or heat exchanger housing, comprising:

a male coupling member having a first end and a second end, wherein said first end attaches to a radiator housing and said male coupling member having at least one chamfered surface on the exterior of said male coupling member positioned between said first end and said second end, and said male coupling member further comprising an annular groove located around the outside of said male coupling member between said first end and said chamfered surface;

a female coupling member, said female coupling member having a first inner bore at a first end, a second intermediate bore having an internal diameter smaller than said first inner bore, and a transitional bore, said transitional bore having an internal diameter less than said second intermediate bore, and a greater diameter than a bore of a second end of said female coupling member, said second end being opposite said first end and comprising a plurality of radial barbed flanges on the exterior of said second end;

a bushing, said bushing having at least one interiorly chamfered surface complementary to the at least one chamfered surface of said male member, wherein said bushing is positioned within said first inner bore, adjacent to said intermediate bore and said bushing comprises an annular ridge which is received within a groove within said first inner bore of said female coupling member;

an O-ring circumferentially complementary to and positioned within said second intermediate bore, adjacent to said transitional bore and retained in position by said bushing; and a locking ring, said locking ring being generally C-shaped, having two distal ends and three evenly spaced indentations, one proximal each of said two distal ends and one centered between the two indentations proximal the distal ends, wherein said locking ring maintains the connection of the male coupling member and the female coupling member by means of said female coupling member further comprising three slots positioned through the body of said female coupling member through said first inner bore for receiving the three indentations respectively of said locking ring when said locking ring is positioned around the outside of said female coupling member proximal said first end, said indentations engaging with said annular grove in a releasable, spring-lock connection means in said groove located around the outside of said male coupling member.

7. The quick connector coupling of claim 6, wherein said transitional bore of said female coupling member further comprises an inversed-angle transition to said inner bore and said bushing also comprises an inversed angled transition adjacent to said sealing means, wherein in combination these two inversed-angle transitions form a dovetail groove within which the sealing means is retained.

8. The quick connector coupling of claim 6, wherein said plurality of radial barbed flanges on the exterior of said second end of said female coupling member comprises three flanges.

9. The quick connector coupling of claim 6, wherein said male coupling member further comprises a tab positioned on the outside of said male coupling member adjacent said first end, said tab being received within a complementary notch located in the first end of said female coupling member, preventing rotational movement between said male coupling member and said female coupling member.

* * * * *